United States Patent
Meney (10) Patent No.: US 11,365,539 B2
(45) Date of Patent: Jun. 21, 2022

(54) STRUCTURAL CONNECTOR

(71) Applicant: Tomba Enterprises Pty Ltd, Midland (AU)

(72) Inventor: David Meney, Midland (AU)

(73) Assignee: TOMBA ENTERPRISES PTY LTD, Midland (AU)

(*) Notice: Subject to any disclaimer, the term of this patent is extended or adjusted under 35 U.S.C. 154(b) by 0 days.

(21) Appl. No.: 16/229,621

(22) Filed: Dec. 21, 2018

(65) Prior Publication Data

US 2019/0345709 A1    Nov. 14, 2019

(30) Foreign Application Priority Data

Dec. 21, 2017   (AU) ................................ 2017905120

(51) Int. Cl.
| | |
|---|---|
| *E04B 1/24* | (2006.01) |
| *F16B 7/02* | (2006.01) |
| *E04C 3/04* | (2006.01) |
| *E04C 3/32* | (2006.01) |

(52) U.S. Cl.
CPC .............. *E04B 1/2403* (2013.01); *F16B 7/02* (2013.01); *E04B 2001/246* (2013.01); *E04B 2001/2421* (2013.01); *E04C 3/04* (2013.01); *E04C 3/32* (2013.01)

(58) Field of Classification Search
CPC ........... E04B 1/2403; E04B 2001/2421; E04B 2001/246; F16B 7/02; E04C 3/32; E04C 3/04
See application file for complete search history.

(56) References Cited

U.S. PATENT DOCUMENTS

| | | | | | |
|---|---|---|---|---|---|
| 2,133,065 | A | * | 10/1938 | Weber ...................... | B60D 1/02 280/504 |
| 2,463,124 | A | * | 3/1949 | Sims ....................... | E04B 1/585 403/334 |
| 3,417,534 | A | * | 12/1968 | McDermott ............ | E04C 2/384 52/802.1 |
| 3,545,123 | A | * | 12/1970 | Muller ................. | A63H 33/046 446/116 |
| 3,545,796 | A | * | 12/1970 | Nicholls ............ | A47B 47/0008 403/187 |
| 3,715,136 | A | * | 2/1973 | Yoshida ................. | A47B 87/02 52/285.2 |
| 3,824,750 | A | * | 7/1974 | Antoniou .............. | E04B 1/3483 52/223.4 |
| 4,023,913 | A | * | 5/1977 | Berkowitz ............ | F16B 7/0446 403/2 |
| 4,111,577 | A | * | 9/1978 | Kiyosawa ............. | F16B 7/0446 403/172 |

(Continued)

FOREIGN PATENT DOCUMENTS

| | | | |
|---|---|---|---|
| CA | 2949446 A1 | * 12/2015 | |
| DE | 2709465 A1 | * 9/1978 | ............... F16B 7/00 |

(Continued)

*Primary Examiner* — Jessie T Fonseca
(74) *Attorney, Agent, or Firm* — Harness, Dickey & Pierce, P.L.C.

(57) ABSTRACT

A structural connector comprising at least one spigot and at least one socket wherein at least a portion of the at least one spigot is tapered and at least a portion of the at least one socket is a complimentary tapered configuration.

16 Claims, 6 Drawing Sheets

(56) References Cited

U.S. PATENT DOCUMENTS

| | | | | |
|---|---|---|---|---|
| 4,145,068 | A * | 3/1979 | Toyomasu | B62K 19/18 280/281.1 |
| 4,673,308 | A * | 6/1987 | Reilly | A47F 5/14 403/172 |
| D311,680 | S * | 10/1990 | Miall | D8/382 |
| 5,265,395 | A * | 11/1993 | Lalvani | B44C 3/123 403/176 |
| 5,421,666 | A * | 6/1995 | Spears | B29C 65/561 403/169 |
| 5,555,681 | A * | 9/1996 | Cawthon | A01G 9/16 52/63 |
| 5,782,048 | A * | 7/1998 | Ramirez | E04H 9/14 52/295 |
| 5,788,400 | A * | 8/1998 | Wey | F16B 7/0413 24/589.1 |
| 6,960,044 | B2 * | 11/2005 | Wadsworth | A47F 5/01 135/909 |
| 9,731,773 | B2 * | 8/2017 | Gami | B62D 27/02 |
| 10,206,506 | B1 * | 2/2019 | Lai | A47B 96/1433 |
| 2004/0206028 | A1 * | 10/2004 | Terrels | E04H 17/1443 52/287.1 |
| 2008/0066393 | A1 * | 3/2008 | Sorensen | A63H 33/101 52/81.1 |
| 2009/0313938 | A1 * | 12/2009 | Li | E04B 1/19 52/656.9 |
| 2012/0272614 | A1 * | 11/2012 | Perner | E02D 27/42 52/745.17 |
| 2015/0208798 | A1 * | 7/2015 | Glenn, II | A47B 13/02 108/158.11 |
| 2015/0225919 | A1 * | 8/2015 | Wagler | E02D 27/42 52/166 |
| 2016/0153205 | A1 * | 6/2016 | Erath | E04G 1/06 52/645 |

FOREIGN PATENT DOCUMENTS

| | | | | |
|---|---|---|---|---|
| KR | 101149602 | B1 * | 5/2012 | |
| KR | 20160074746 | A * | 6/2016 | |
| WO | WO-2008135634 | A1 * | 11/2008 | E04B 1/24 |
| WO | WO-2013155587 | A1 * | 10/2013 | E04B 1/185 |

* cited by examiner

STRUCTURAL CONNECTOR

TECHNICAL FIELD

A structural connector for modular structures.

BACKGROUND ART

Traditionally, individual steel members of a structure are fabricated and delivered to site where they are individually connected together using predominantly bolted connections ("stick-built"). Structural steel systems have been fabricated using modular construction methods for many years and their implementation has been shown to reduce total construction costs. Transporting large pre-fabricated structures minimises site time but transport costs and logistics can increase.

There is a need for a modular structure as an alternative to traditional 'stick-built' structures that reduces transport size and volume but still affords minimum site erection time.

The preceding discussion of the background to the invention is intended to facilitate an understanding of the present invention. However, it should be appreciated that the discussion is not an acknowledgement or admission that any of the material referred to was part of the common general knowledge in Australia or any other country as at the priority date.

SUMMARY OF INVENTION

In accordance with the present invention, there is provided a structural connector comprising at least one spigot and at least one socket wherein at least a portion of the at least one spigot is tapered and at least a portion of the at least one socket is a complimentary tapered configuration.

In one form of the invention, the tapered portion of the spigot is a cone. In an alternate form of the invention, the tapered portion of the spigot is a frustum. In an alternate form of the invention, the tapered portion of the spigot is curved. Where the tapered portion of the spigot is curved, it is preferably provided in the form of a dome.

Where the tapered portion of the spigot is a cone, the cone may be provided in the form of a circular cone, an elliptical cone or a polyhedral cone.

In the context of the present invention, the term polyhedral cone shall be understood to encompass pyramids.

In one form of the invention, the polyhedral cone is provided in the form of a quadrilateral pyramid. The quadrilateral pyramid may have an irregular base or a rectangular base or a square base.

Preferably, the tapered portion of the spigot is frusto-conical and at least a portion of the socket is a complimentary frusto-conical configuration.

The spigot is adapted to be connected to a structural member such as a column or a beam. In the context of the present specification, a spigot attached to a column may be referred to as a column spigot. In the context of the present specification, a spigot attached to a beam may be referred to as a beam spigot. It will be appreciated that the shapes and dimensions of column spigots and beam spigots may differ from each other when used in a modular structure.

Preferably, the cross-section shape of the spigot is substantially the same as the cross-sectional shape of the column or beam to which the spigot is intended to be attached. For example, where the column is a cylinder, the portion of the spigot distal to the tapered portion is a cylinder of substantially equal diameter.

In one form of the invention, the connector is provided with one socket adapted to receive a column spigot. In an alternate form of the invention, the connector is provided with two opposed sockets, each adapted to receive column spigots.

In one form of the invention, the connector is provided with one socket adapted to receive a beam spigot. In an alternate form of the invention, the connector is provided with two substantially perpendicular sockets, each adapted to receive beam spigots.

In alternate form of the invention, the connector is provided with two substantially perpendicular sockets, one adapted to receive a column spigot and the other one adapted to receive a beam spigot.

In alternate form of the invention, the connector is provided with three substantially perpendicular sockets, one adapted to receive a column spigot and the other two adapted to receive beam spigots.

In alternate form of the invention, the connector is provided with three substantially perpendicular sockets, two of which are opposed sockets and are adapted to receive column spigots and the remaining socket is substantially perpendicular to both of the two opposed sockets and is adapted to receive a beam spigot.

In alternate form of the invention, the connector is provided with four sockets, two of which are opposed sockets and are adapted to receive column spigots and the remaining two are substantially perpendicular to each other and substantially perpendicular to the opposed sockets and are adapted to receive beam spigots.

In alternate form of the invention, the connector is provided with five sockets, two of which are opposed sockets and are adapted to receive column spigots and the remaining three are substantially perpendicular to the opposed sockets and are adapted to receive beam spigots.

In alternate form of the invention, the connector is provided with six sockets, two of which are opposed sockets and are adapted to receive column spigots and the remaining four are substantially perpendicular to the opposed sockets and are adapted to receive beam spigots.

In one form of the invention, the connector comprises at least one beam or a portion thereof, said at least one beam or a portion thereof extending substantially perpendicularly to the longitudinal axes of the spigot and socket. Depending on the location of the connector in a building, it is anticipated that the connector may be provided with up to four beams. Where a connector is to be utilised in a 90° corner of a structure, it is expected that it will be provided with two co-planar beams at 90° to each other.

In one form of the invention, the tapered portion of the spigot is between 10% and 90% of the length of the spigot. In an alternate form of the invention, the tapered portion of the spigot is between 10% and 80% of the length of the spigot. In an alternate form of the invention, the tapered portion of the spigot is between 10% and 70% of the length of the spigot. In an alternate form of the invention, the tapered portion of the spigot is between 10% and 60% of the length of the spigot. In an alternate form of the invention, the tapered portion of the spigot is between 10% and 50% of the length of the spigot. In an alternate form of the invention, the tapered portion of the spigot is between 10% and 40% of the length of the spigot. In an alternate form of the invention, the tapered portion of the spigot is between 10% and 30% of the length of the spigot. In an alternate form of the invention, the tapered portion of the spigot is between 10% and 20% of the length of the spigot.

In one form of the invention, the tapered portion of the spigot between 20% and 90% of the length of the spigot. In an alternate form of the invention, the tapered portion of the spigot is between 20% and 80% of the length of the spigot. In an alternate form of the invention, the tapered portion of the spigot is between 20% and 70% of the length of the spigot. In an alternate form of the invention, the tapered portion of the spigot is between 20% and 60% of the length of the spigot. In an alternate form of the invention, the tapered portion of the spigot is between 20% and 50% of the length of the spigot. In an alternate form of the invention, the tapered portion of the spigot is between 20% and 40% of the length of the spigot. In an alternate form of the invention, the tapered portion of the spigot is between 20% and 30% of the length of the spigot.

In one form of the invention, the tapered portion of the spigot is between 30% and 90% of the length of the spigot. In an alternate form of the invention, the tapered portion of the spigot is between 30% and 80% of the length of the spigot. In an alternate form of the invention, the tapered portion of the spigot is between 30% and 70% of the length of the spigot. In an alternate form of the invention, the tapered portion of the spigot is between 30% and 60% of the length of the spigot. In an alternate form of the invention, the tapered portion of the spigot is between 30% and 50% of the length of the spigot. In an alternate form of the invention, the tapered portion of the spigot is between 30% and 40% of the length of the spigot.

In one form of the invention, the tapered portion of the spigot is between 40% and 90% of the length of the spigot. In an alternate form of the invention, the tapered portion of the spigot is between 40% and 80% of the length of the spigot. In an alternate form of the invention, the tapered portion of the spigot is between 40% and 70% of the length of the spigot. In an alternate form of the invention, the tapered portion of the spigot is between 40% and 60% of the length of the spigot. In an alternate form of the invention, the tapered portion of the spigot is between 40% and 50% of the length of the spigot.

In one form of the invention, the tapered portion of the spigot is between 50% and 90% of the length of the spigot. In an alternate form of the invention, the tapered portion of the spigot is between 50% and 80% of the length of the spigot. In an alternate form of the invention, the tapered portion of the Spigot is between 50% and 70% of the length of the spigot. In an alternate form of the invention, the tapered portion of the spigot is between 50% and 60% of the length of the spigot.

In one form of the invention, the tapered portion of the spigot is between 60% and 90% of the length of the spigot. In an alternate form of the invention, the tapered portion of the spigot is between 60% and 80% of the length of the spigot. In an alternate form of the invention, the tapered portion of the spigot is between 60% and 70% of the length of the spigot.

In one form of the invention, the tapered portion of the spigot is about 10% of the length of the spigot. In one form of the invention, the tapered portion of the spigot is about 20% of the length of the spigot. In one form of the invention, the tapered portion of the spigot is about 30% of the length of the spigot. In one form of the invention, the tapered portion of the spigot is about 40% of the length of the spigot. In one form of the invention, the tapered portion of the spigot is about 50% of the length of the spigot. In one form of the invention, the tapered portion of the spigot is about 60% of the length of the spigot. In one form of the invention, the tapered portion of the spigot is about 70% of the length of the spigot. In one form of the invention, the tapered portion of the spigot is about 80% of the length of the spigot. In one form of the invention, the tapered portion of the spigot is about 90% of the length of the spigot.

The length of the spigot is preferably between one and two times the maximum width of the column or beam connected to the spigot. More preferably, the length of the spigot is between one and one and a half times the maximum width of the column or beam connected to the spigot.

The dimensions of the spigot will be influenced by the intended use. While the present invention is described by way of embodiments in the construction industry, the invention may be other uses including in racking/shelving. In a construction application, the length of the spigot is preferably between 500 mm and 1500 mm. More preferably, the length of the spigot is between 500 mm and 1000 mm.

In one form of the invention, the spigot is about 750 mm long and the tapered portion is about 250 mm long.

Preferably, the depth of the tapered portion of the socket is approximately the same as the length of the tapered portion of the spigot.

Preferably, the length of the non-tapered portion of the socket, is approximately the same as the length of the non-tapered portion of the spigot.

It will be appreciated that the width of the spigot will be influenced by the nature of the construction and the materials used. The width of the spigot may be substantially the same as the width of the column or beam attached thereto. Where the column and the spigot are metal and the connector is to be utilised in a multistorey structure, it is anticipated that the spigot and column diameters will be between 200 and 600 mm. In one form of the invention, the diameters are about 400 mm. Where the spigot and the column are welded together, the width of the spigot and width of the column would be substantially the same. Where the spigot and the column are screwed together, the width of the spigot would be larger than the width of the column to accommodate an internal thread on the spigot and an external thread on the column.

In one form of the invention, the angle of the tapered portion of the spigot is between 10 and 80°. In an alternate form of the invention, the angle of the tapered portion of the spigot is between 10 and 70°. In an alternate form of the invention, the angle of the tapered portion of the spigot is between 10 and 60°. In an alternate form of the invention, the angle of the tapered portion of the spigot is between 10 and 50°. In an alternate form of the invention, the angle of the tapered portion of the spigot is between 10 and 40°. In an alternate form of the invention, the angle of the tapered portion of the spigot is between 10 and 30°. In an alternate form of the invention, the angle of the tapered portion of the spigot is between 10 and 20°.

In one form of the invention, the angle of the tapered portion of the spigot is between 20 and 80°. In an alternate form of the invention, the angle of the tapered portion of the spigot is between 20 and 70°. In an alternate form of the invention, the angle of the tapered portion of the spigot is between 20 and 60°. In an alternate form of the invention, the angle of the tapered portion of the spigot is between 20 and 50°. In an alternate form of the invention, the angle of the tapered portion of the spigot is between 20 and 40°. In an alternate form of the invention, the angle of the tapered portion of the spigot is between 20 and 30°.

In one form of the invention, the angle of the tapered portion of the spigot is between 30 and 80°. In an alternate form of the invention, the angle of the tapered portion of the spigot is between 30 and 70°. In an alternate form of the invention, the angle of the tapered portion of the spigot is between 30 and 60°. In an alternate form of the invention, the angle of the tapered portion of the spigot is between 30 and 50°. In an alternate form of the invention, the angle of the tapered portion of the spigot is between 30 and 40°.

In one form of the invention, the angle of the tapered portion of the spigot is between 40 and 80°. In an alternate form of the invention, the angle of the tapered portion of the spigot is between 40 and 70°. In an alternate form of the invention, the angle of the tapered portion of the spigot is between 40 and 60°. In an alternate form of the invention, the angle of the tapered portion of the spigot is between 40 and 50°.

In one form of the invention, the angle of the tapered portion of the spigot is between 50 and 80°. In an alternate form of the invention, the angle of the tapered portion of the spigot is between 50 and 70°. In an alternate form of the invention, the angle of the tapered portion of the spigot is between 50 and 60°.

In one form of the invention, the angle of the tapered portion of the spigot is between 60 and 80°. In an alternate form of the invention, the angle of the tapered portion of the spigot is between 60 and 70°.

In one form of the invention, the angle of the tapered portion of the spigot is between 70 and 80°.

In one form of the invention, the angle of the tapered portion of the spigot is about 10°. In an alternate form of the invention, the angle of the tapered portion of the spigot is about 20°. In an alternate form of the invention, the angle of the tapered portion of the spigot is about 30°. In an alternate form of the invention, the angle of the tapered portion of the spigot is about 40°. In an alternate form of the invention, the angle of the tapered portion of the spigot is about 50°. In an alternate form of the invention, the angle of the tapered portion of the spigot is about 60°. In an alternate form of the invention, the angle of the tapered portion of the spigot is about 70°. In an alternate form of the invention, the angle of the tapered portion of the spigot is about 80°.

Preferably, the angle of the tapered portion of the spigot is about 30°.

In one form of the invention, the spigot is provided with an annular ridge at the end distal to the tapered portion. The annular ridge facilitates the connection of the spigot to a column. Where the spigot and the column are metal, they are preferably welded together.

In an alternate form of the invention, the spigot and the column or the spigot and the beam are threadably engaged.

The socket may be provided with side walls adapted to engage the non-tapered portion of the spigot. In this manner, the tapered portion of the spigot is engaged by the complimentary tapered portion of the socket and the side walls of the socket engage the non-tapered portion of the spigot.

The complimentary connection between the spigot and the socket preferably provides a snug fit. The annular clearance between the spigot and the socket is preferably less than 2 mm. More preferably, the annular clearance between the spigot and the socket is less than 1 mm. More preferably, the annular clearance between the spigot and the socket is less than 0.5 mm.

It will be appreciated that too much tolerance and the structure displacement will be unserviceable. Too little and the connection may not fit or may not fit without force on the column.

Preferably, the connection is manufactured using metal additive manufacturing (3D printing). Advantageously, 3D printing can provide smaller tolerances than other methods of fabrication.

Advantageously, the tapered portion enables the spigot and the socket to be self-locating.

There may be provided provision for length adjustment to ensure the centre to centre distance between columns is maintained despite a length tolerance in the beam with welded-on spigots. This may offer advantages for beam sockets in particular.

The spigot and the socket will preferably comprise material of higher grade than the associated beams or columns. It is known to use mild steel of yield strength approximately 250-350 MPa in construction. A spigot intended for connection to such a column should use material with a higher yield strength.

In one form of the invention, the spigot and socket are prepared from stainless steel. In an alternate form of the invention, the spigot and socket are prepared from titanium. In an alternate form of the invention, the spigot and socket are prepared from a composite material or high strength carbon fibre.

BRIEF DESCRIPTION OF THE DRAWINGS

Further features of the present invention are more fully described in the following description of non-limiting embodiments thereof. This description is included solely for the purposes of exemplifying the present invention. It should not be understood as a restriction on the broad summary, disclosure or description of the invention as set out above. The description will be made with reference to the accompanying drawings in which.

DESCRIPTION OF EMBODIMENTS

Throughout this specification, unless the context requires otherwise, the word "comprise" or variations such as "comprises" or "comprising", will be understood to imply the inclusion of a stated integer or group of integers but not the exclusion of any other integer or group of integers.

Those skilled in the art will appreciate that the invention described herein is amenable to variations and modifications other than those specifically described. It is to be understood that the invention includes all such variations and modifications. The invention also includes all of the steps, features, compositions and compounds referred to or indicated in the specification, individually or collectively and any and all combinations or any two or more steps or features.

Figure 1:
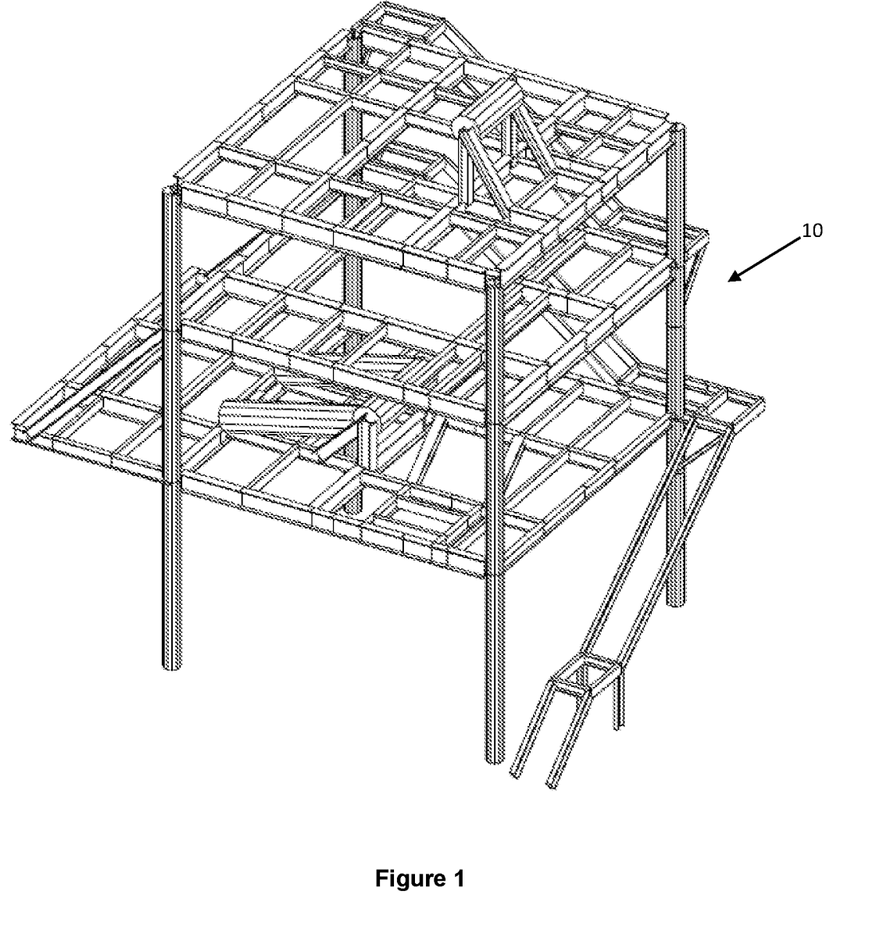
FIG. 1 is a perspective view of a modular structure incorporating a plurality of connectors in accordance with various embodiments of the present invention.

FIG. 1 provides a representation of a three level structure 10 with dimensions of 6.7×6.5×10 m. Level 1 supports a feeder with a cantilevered extension 3.25×6.5 m; level 2 supports a feeder bin of 19 m$^3$ and level 3 which supports a conveyer and associated head chute.

Figure 2:
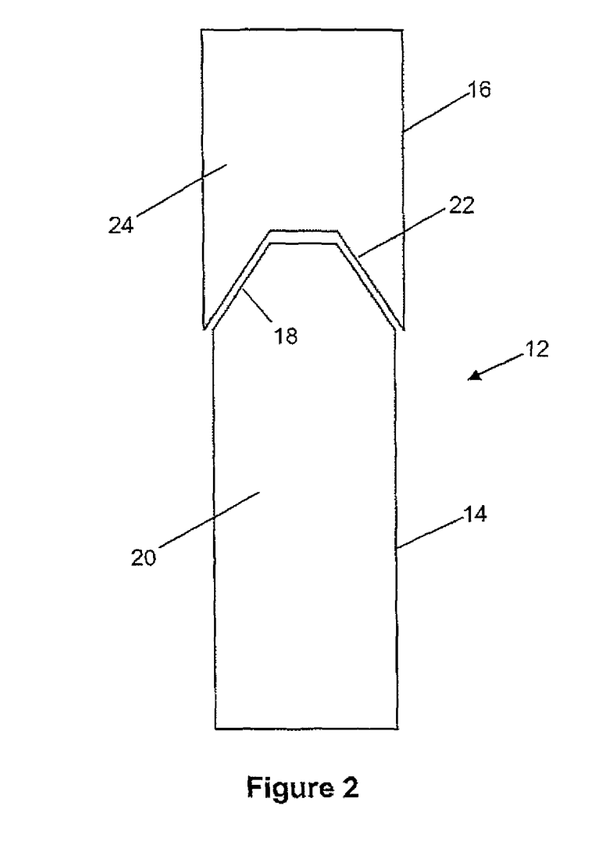
FIG. 2 is a side view of a connector in accordance with a first embodiment of the present invention.

In FIG. 2, there is provided a cross section of a structural connector in accordance with a first embodiment of the present invention. The structural connector 12 comprises a spigot 14 and a socket 16. The spigot 14 comprises a tapered portion 18 and a non-tapered portion 20. The socket 16 comprises a tapered portion 22 and a non-tapered portion 24.

Figure 3:
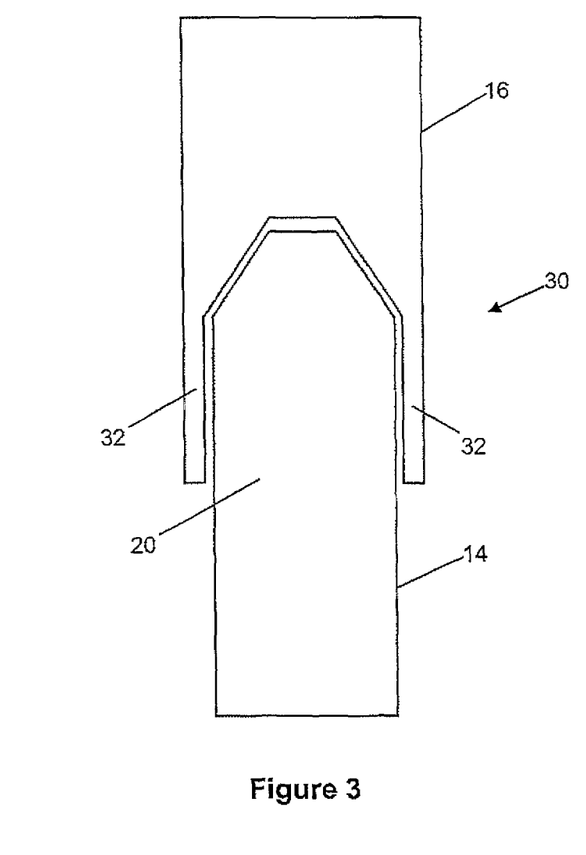
FIG. 3 is a side view of a connector in accordance with a second embodiment of the present invention.

In FIG. 3, there is provided a cross section of a structural connector in accordance with a second embodiment of the present invention. Like numerals in FIG. 3 denote like parts in FIG. 2. The structural connector 30 comprises a spigot 14 and a socket 16. The socket 16 comprises a side wall 32 adapted to engage at least a portion of the non-tapered portion 20 of the spigot 14.

Figure 4:
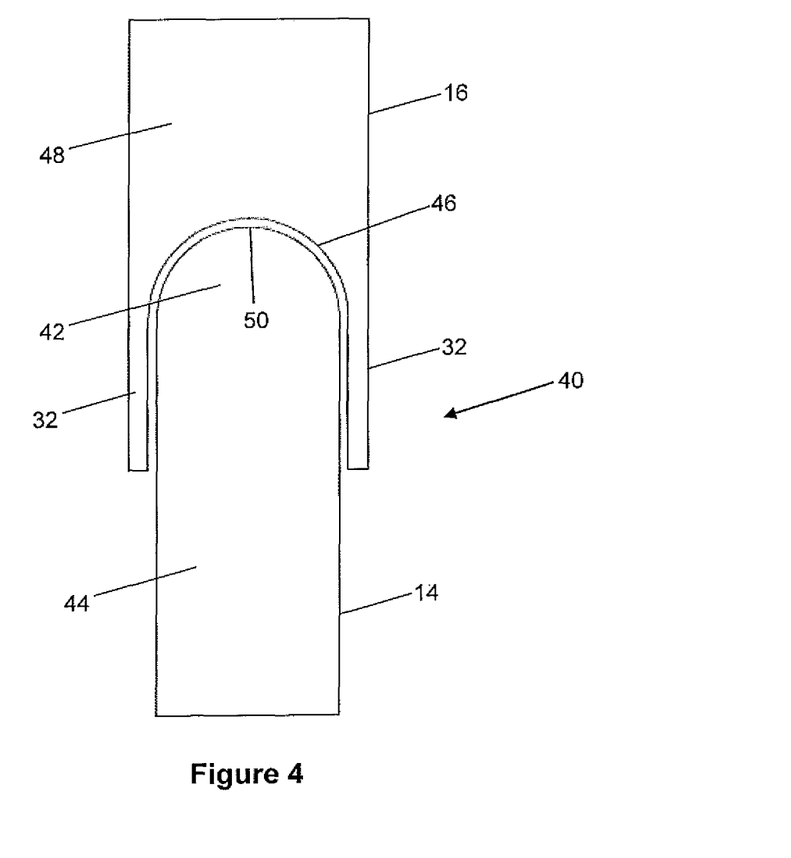
FIG. 4 is a side view of a connector in accordance with a third embodiment of the present invention.

In FIG. 4, there is provided a cross section of a structural connector in accordance with a third embodiment of the present invention. Like numerals in FIG. 4 denote like parts in FIG. 2. The structural connector 40 comprises a spigot 14 and a socket 16. The spigot 14 comprises a tapered portion 42 and a non-tapered portion 44. The socket 16 comprises a tapered portion 46 and a non-tapered portion 48. The tapered portion 42 of the spigot 14 is in the form of a dome 50. The dome 50 is represented as a hemisphere of constant radius. It will be appreciated that it could be ellipsoid. The tapered portion 46 of the socket 16 is a complementary shaped spherical shape. The socket 16 comprises a side wall 32 adapted to engage at least a portion of the non-tapered portion 44 of the spigot 14.

Figure 5:
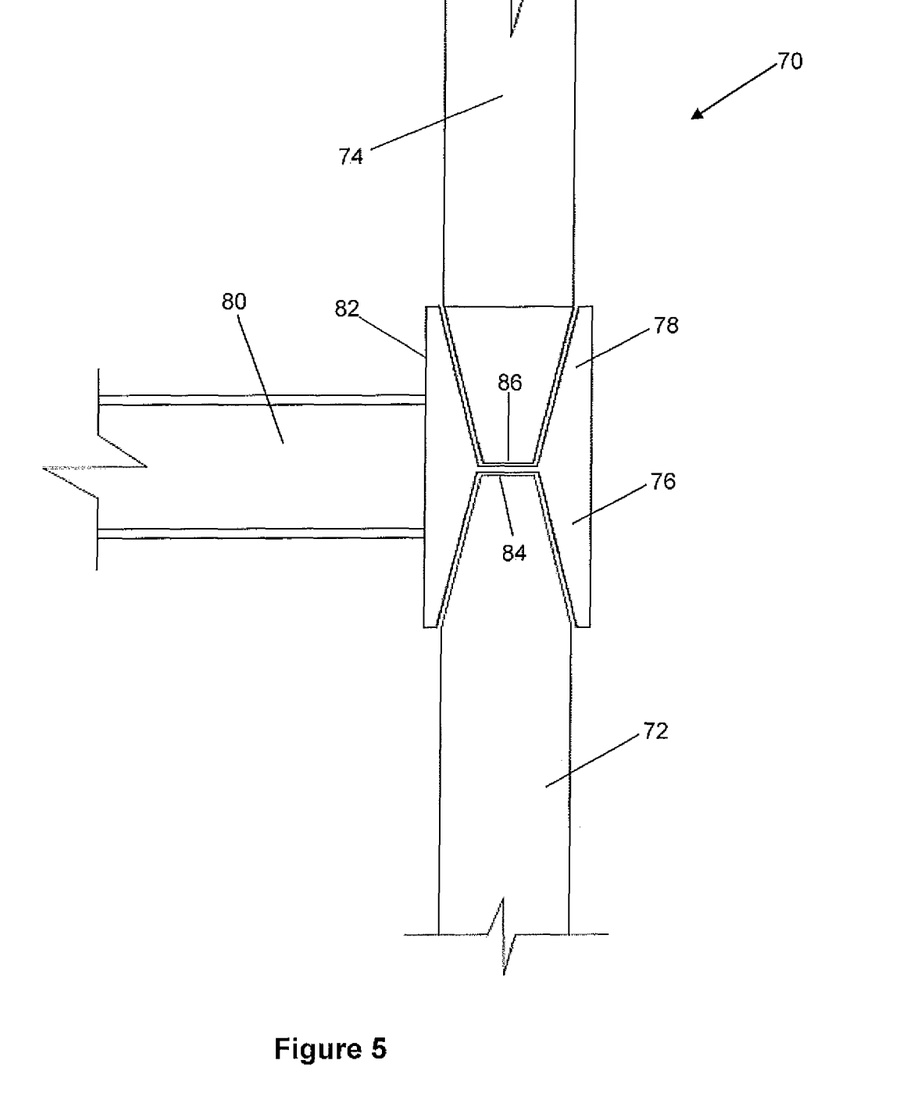
FIG. 5 is a side view of a connector in accordance with a fourth embodiment of the present invention.

In FIG. 5, there is provided a cross section of a structural connector in accordance with a fourth embodiment of the present invention. The structural connector 70 comprises a first column spigot 72 and an opposed second column spigot 74, a first socket 76 and a second socket 78, and a beam 80. The first socket 76 and the second socket 78 are provided as one piece. The beam 80 is welded to an outer surface 82 of the connector 70. Welding of the column to the connector assists in the efficient transfer of bending and axial forces.

As seen in FIG. 5, the upper surface 84 of the first spigot 72 may abut the corresponding surface 86 of the second spigot 74. This abutment can carry the column compression and reduce stresses in the column.

Figure 6:
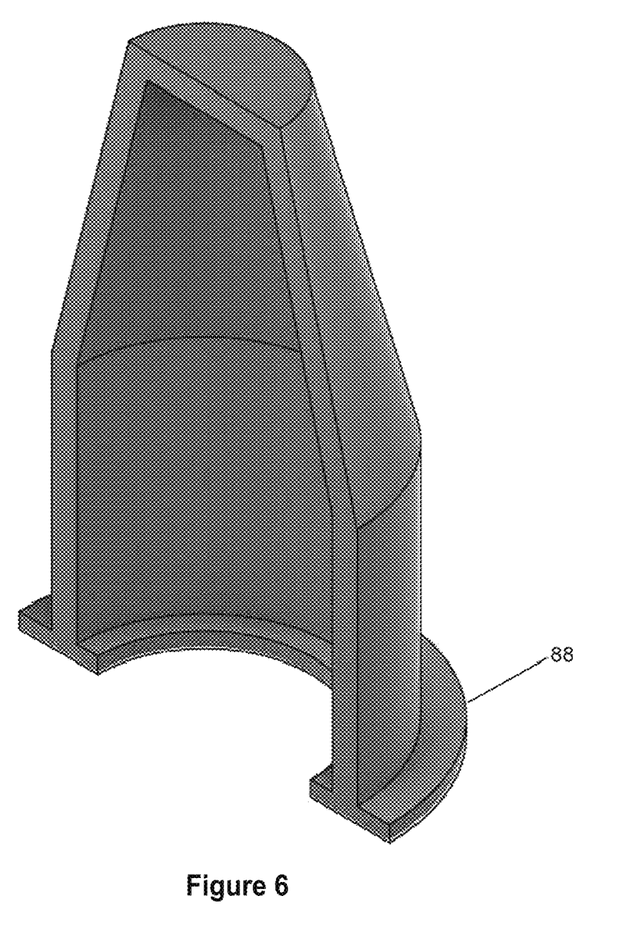
FIG. 6 is a cut away view of a spigot in in accordance with a fifth embodiment of the present invention.

An annular ring 88 is provided at the base of the spigot to facilitate connection to a column. The annular ring extends into the interior of the spigot and beyond the diameter as shown in FIG. 6. Where the spigot and the column are screwed together, the annular ring 88 would not be required.

The sockets are slightly shorter than the spigots, to ensure only bearing or friction is used at the sides and top of the connection, not at the base of the sockets.

Consider two tubular columns, telescoped together. When bending occurs at the join, a jamming effect due to friction provides a resistance to any tension (e.g. uplift) or compression that is applied. This combined axial force and bending moment occurs when horizontal loads from, for example, wind or seismic loading are applied to a frame structure. As the bending moment increases, the resistance between the two bodies creates a greater jamming effect due to the couple produced. Referring to the present invention, when a bending moment is induced within the beam and/or column, it will create a jamming effect in the connector and resist any axial forces (including uplift).

Figure 7:
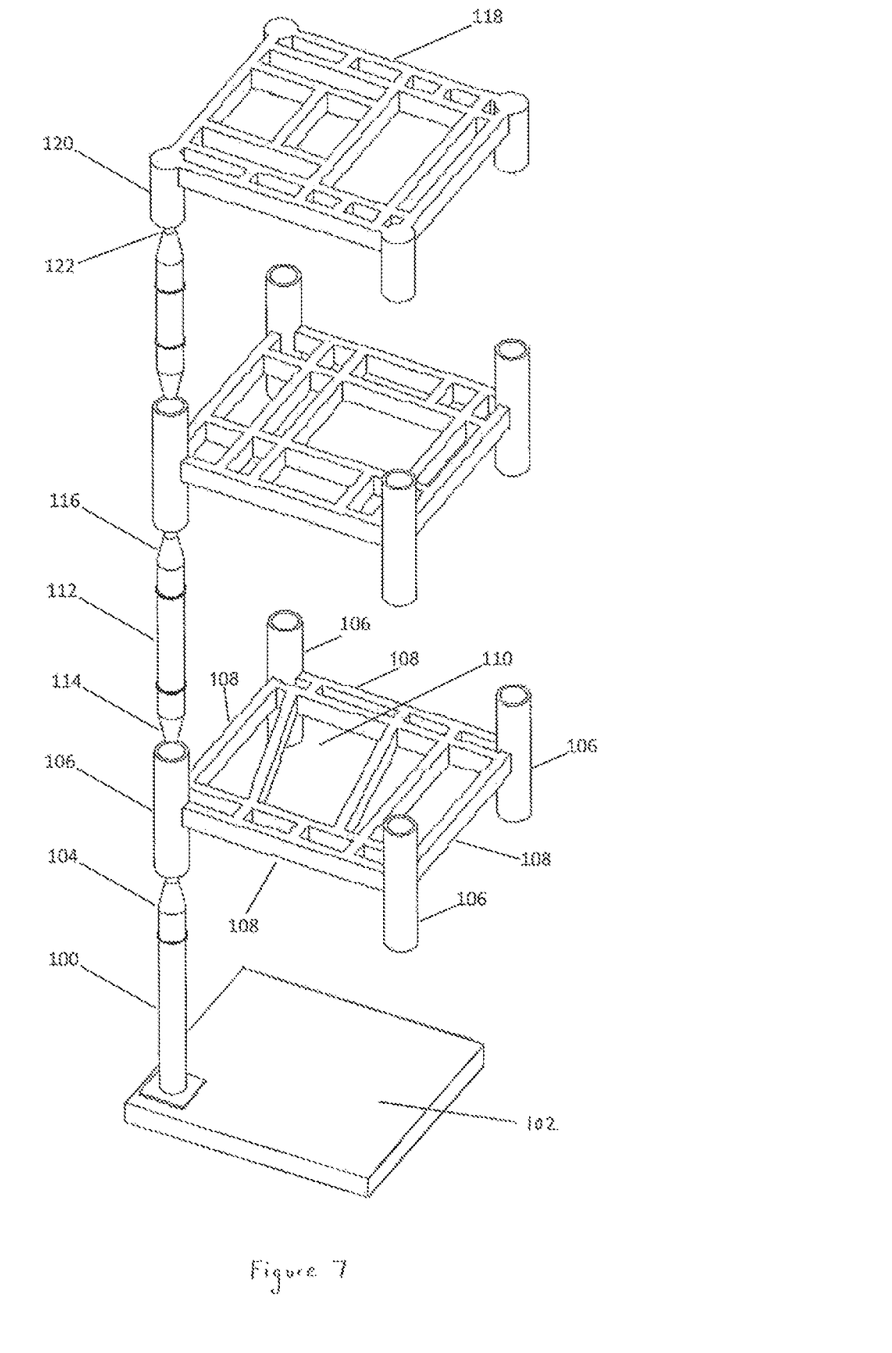
FIG. 7 is a partial exploded view of a modular structure incorporating a plurality of connectors in accordance with a sixth embodiment of the present invention.

In use, there may be provided four cylindrical columns 100 loosely bolted to a concrete base plate 102 in the conventional manner (only one column being depicted in FIG. 7). The columns 100 have frusto-conical spigots 104 attached to their upper ends. Four connectors 106 with opposed sockets in accordance with the present invention are joined by conventional beams 108 to provide a floor 110. The four connectors 106 are spatially oriented in the same manner as the four columns 100 on the base plate 102. The floor 110 is lowered by crane onto the four columns 100 on the base plate 102. The tapering of the spigots advantageously provides for self centering of the connectors 106. Under its own weight, the floor 110 will install onto the columns on the base plate 102. If necessary, they may be further tapped into place. If the column 100 and the corresponding spigot 104 are threadably connected, it is possible to change the level of the floor 110 during installation.

Four further columns 112 (only one shown in FIG. 8), each with spigots at both ends 114, 116 are then lowered onto the four sockets 106. The process may be repeated as required. The uppermost floor 118 may have connectors 120 with only one socket 122 each. It will be appreciated that the system can be used with more than four columns. In a larger installation, the grid beams would be connected to the connectors and the entire floor lifted over the receiving columns. Alternatively, in some applications, only one column may be used, for example as a cantilever beam or column in a jib crane, light pole or a shelving bracket.

3D printing of steel components is made possible using Direct Metal Laser Sintering (DMLS), an additive manufacturing process. Components are built up, layer by layer, using a laser to selectively sinter (heat and fuse) a powdered metal into a solid part.

Table 1 shows the variety of stainless steels available to print. For the purpose of the specification, Stainless Steel Alloy 420 (SS 420) and Stainless Steel 17-4 (SS 17-4) was used within the analysis to ensure a conservative and non-conservative approach.

TABLE 2.1

3D Printed Stainless Steel Properties

|  | SS 17-4[1] | SS 316L[2] | SS 420[3] | Mild Steel 300[4] |
|---|---|---|---|---|
| Yield Strength (MPa) | 730 | 475 | 427 | 300 |
| Ultimate Tensile Strength (MPa) | 1041 | 538 | 496 | 430 |
| Modulus pf Elasticity (GPa) | 170 | 168 | 147 | 200 |
| Elongation at Break (%) | 17 | 50 | 7 | 21 |
| Hardness | 30 (HRC) | 85 (HRC) | 93 (HRC) | 130 (HBN) |
| Description | Excellent weld ability and corrosion resistance; cost effective. | Excellent weld ability, corrosion resistance and ductility. | | |

[1]Stainless steel 17-4 (Stratasys)
[2]Stainless steel 316L (Stratasys)
[3]Stainless steel Alloy 420 (Shapeways)
[4]300 Grade Mild Steel (DCT; BHN)

It has been identified that the benefits of the present invention compared to conventional installation are reduced erection times, the ability to pre-install equipment such as chutes and screens, and the reduction or even elimination of bracing members that can facilitate improved maintenance access.

The invention claimed is:

1. A structural connector comprising:
at least one spigot; and
at least one socket, wherein a portion of the at least one spigot is tapered and a portion of the at least one socket has a complimentary tapered configuration, wherein the at least one socket comprises a substantially cylindrical side wall adapted to engage at least a portion of a non-tapered portion of the corresponding at least one spigot, and wherein the connector further comprises at least one beam integrally formed with the at least one socket or the at least one spigot, the at least one beam extending substantially perpendicularly to the longitudinal axes of the at least one spigot or the at least one socket.

2. A structural connector in accordance with claim 1, wherein the tapered portion of the at least one spigot is a cone, a frustum, or is curved.

3. A structural connector in accordance with claim 2, wherein the curved tapered portion of the at least one spigot is a dome.

4. A structural connector in accordance with claim 2, wherein the cone is a circular cone or an elliptical cone.

5. A structural connector in accordance with claim 1, wherein the tapered portion of the spigot is frusto-conical and at least a portion of the socket is a complimentary frusto-conical configuration.

6. A structural connector in accordance with claim 1, wherein the connector is provided with two sockets adapted to receive two spigots.

7. A structural connector in accordance with claim 6, wherein the two sockets are integrally formed.

8. A structural connector in accordance with claim 1, wherein the at least one beam is connected to the at least one spigot, and a length of the at least one spigot is between one and two times the maximum width of the at least one beam.

9. A structural connector in accordance with claim 1, wherein the at least one spigot comprises an annular ridge at an end distal to the tapered portion to facilitate the connection of the at least one spigot to a column or a beam.

10. A structural connector in accordance with claim 1, wherein an annular clearance between the at least one spigot and the at least one socket is less than 1 mm.

11. A structural connector in accordance with claim 1, wherein an annular clearance between the at least one spigot and the at least one socket is less than 0.5 mm.

12. A structural connector in accordance with claim 1, wherein a complimentary connection between the at least one spigot and the at least one socket provides a snug fit with an annular clearance between the at least one spigot and the at least one socket of less than 2 mm.

13. A structural connector in accordance with claim 1, wherein the at least one spigot has a first total height and the at least one socket has a second total height, and the second total height is less than the first total height.

14. A structural connector in accordance with claim 1, wherein the at least one beam is formed from a metal having a first grade and one or both of the at least one spigot and the at least one socket are formed from a metal having a second grade, wherein the second grade is greater than the first grade.

15. A structural connector in accordance with claim 1, wherein the at least one beam is welded to the at least on spigot.

16. A structural connector in accordance with claim 1, wherein the tapered portion of the at least one spigot is between 10% and 20% of a total length of the spigot.

* * * * *